(12) United States Patent
Hailpern et al.

(10) Patent No.: US 11,399,166 B2
(45) Date of Patent: Jul. 26, 2022

(54) RELATIONSHIP PRESERVING PROJECTION OF DIGITAL OBJECTS

(71) Applicant: ENT. SERVICES DEVELOPMENT CORPORATION LP, Houston, TX (US)

(72) Inventors: Joshua Hailpern, Sunnyvale, CA (US); William J. Allen, Corvallis, OR (US); James C. Cooper, Bloomington, IN (US); Kieran McCorry, Belfast (GB)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 0 days.

(21) Appl. No.: 17/320,819

(22) Filed: May 14, 2021

(65) Prior Publication Data

US 2021/0274140 A1    Sep. 2, 2021

Related U.S. Application Data

(63) Continuation of application No. 16/748,383, filed on Jan. 21, 2020, now abandoned, which is a continuation of application No. 15/547,739, filed as application No. PCT/US2015/013742 on Jan. 30, 2015, now abandoned.

(51) Int. Cl.
*H04N 9/31* (2006.01)
*H04N 7/15* (2006.01)

(52) U.S. Cl.
CPC ............ *H04N 9/3194* (2013.01); *H04N 7/15* (2013.01); *H04N 7/157* (2013.01); *H04N 7/155* (2013.01)

(58) Field of Classification Search
None
See application file for complete search history.

(56) References Cited

U.S. PATENT DOCUMENTS

| | | |
|---|---|---|
| 2005/0143848 A1 | 6/2005 | Fukui |
| 2006/0244817 A1 | 11/2006 | Harville |
| 2009/0094188 A1 | 4/2009 | Covannon |
| 2009/0119593 A1 | 5/2009 | Hallock |
| 2010/0111441 A1* | 5/2010 | Xiong ................. G06T 5/00 382/275 |

(Continued)

OTHER PUBLICATIONS

International Application No. PCT/US2015/013742 International Search Report and Written Opinion dated Oct. 19, 2015 (10 pages).

(Continued)

*Primary Examiner* — Michelle Chin
(74) *Attorney, Agent, or Firm* — Polsinelli PC (57) ABSTRACT

Examples associated with relationship preserving projection of digital objects are disclosed. One example includes identifying suitable locations within a physical space for projection of digital objects. The digital objects may be stored in a virtual space. A representation of a first digital object from the virtual space may be projected onto a first suitable location in the physical space and a representation of a second digital object from the virtual space may be projected onto a second suitable location in the physical space. The first suitable location and the second suitable location may preserve a spatial relationship between the first digital object and the second digital object.

14 Claims, 6 Drawing Sheets

(56) References Cited

U.S. PATENT DOCUMENTS

| | | |
|---|---|---|
| 2012/0218306 A1 | 8/2012 | Micardle |
| 2012/0223885 A1 | 9/2012 | Perez |
| 2013/0024785 A1* | 1/2013 | Van Wie ............... H04M 3/567 |
| | | 715/753 |
| 2013/0030903 A1 | 1/2013 | Zambala |
| 2013/0044193 A1 | 2/2013 | Kulkami |
| 2013/0121619 A1 | 5/2013 | Intwala |
| 2013/0328927 A1 | 12/2013 | Mount |
| 2014/0176591 A1 | 6/2014 | Klein |

OTHER PUBLICATIONS

European Patent Application No. 15880476.5, Search Report dated Aug. 16, 2018 (14 pages).

* cited by examiner

RELATIONSHIP PRESERVING PROJECTION OF DIGITAL OBJECTS

CROSS-REFERENCE TO RELATED APPLICATIONS

This application is a continuation of U.S. patent application Ser. No. 16/748,383, filed on Jan. 21, 2020, entitled "RELATIONSHIP PRESERVING PROJECTION OF DIGITAL OBJECTS", which is a continuation of U.S. patent application Ser. No. 15/547,739, filed Jul. 31, 2017, entitled "RELATIONSHIP PRESERVING PROJECTION OF DIGITAL OBJECTS" the National Stage of International Application No. PCT/US2015/013742, filed on Jan. 30, 2015, which are all incorporated herein in their entireties.

BACKGROUND

There are two main ways that meetings take place, depending primarily on whether there is a single, appropriate space that is accessible to all parties, if such a space is available, the meeting may be held in that space. If such a space is not available, (e.g., because all available spaces are too small to fit all parties, the parties are spread across great distances), then some form of teleconferencing system may be used. These teleconferencing systems work by transmitting, for example, video, slides, audio, and so forth, to other locations simultaneously so that participants can engage in synchronous communication.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems, methods, and equivalents associated with relationship preserving projection of digital objects are described. Relationship preserving projection of digital objects may be achieved by analyzing a physical space to identify locations within the physical space suitable for projection of digital objects. The digital objects may be organized using a virtual space that also preserves location information for the digital objects. The location information may be, for example, absolute location information for digital objects as the objects are added to the virtual space. The location information may also be relative location information that describes how digital objects have been organized relative to one another. The organization of digital objects may be based on how users have interacted and/or organized digital objects, or artifacts from which the digital objects were generated. Once suitable locations have been identified, representations of digital objects may be projected onto the suitable locations a manner that preserves spatial relationships between the digital objects. This may preserve information regarding artifacts and/or digital objects that would not be stored if solely the "content" of the artifacts and/or digital objects is maintained.

Figure 1:
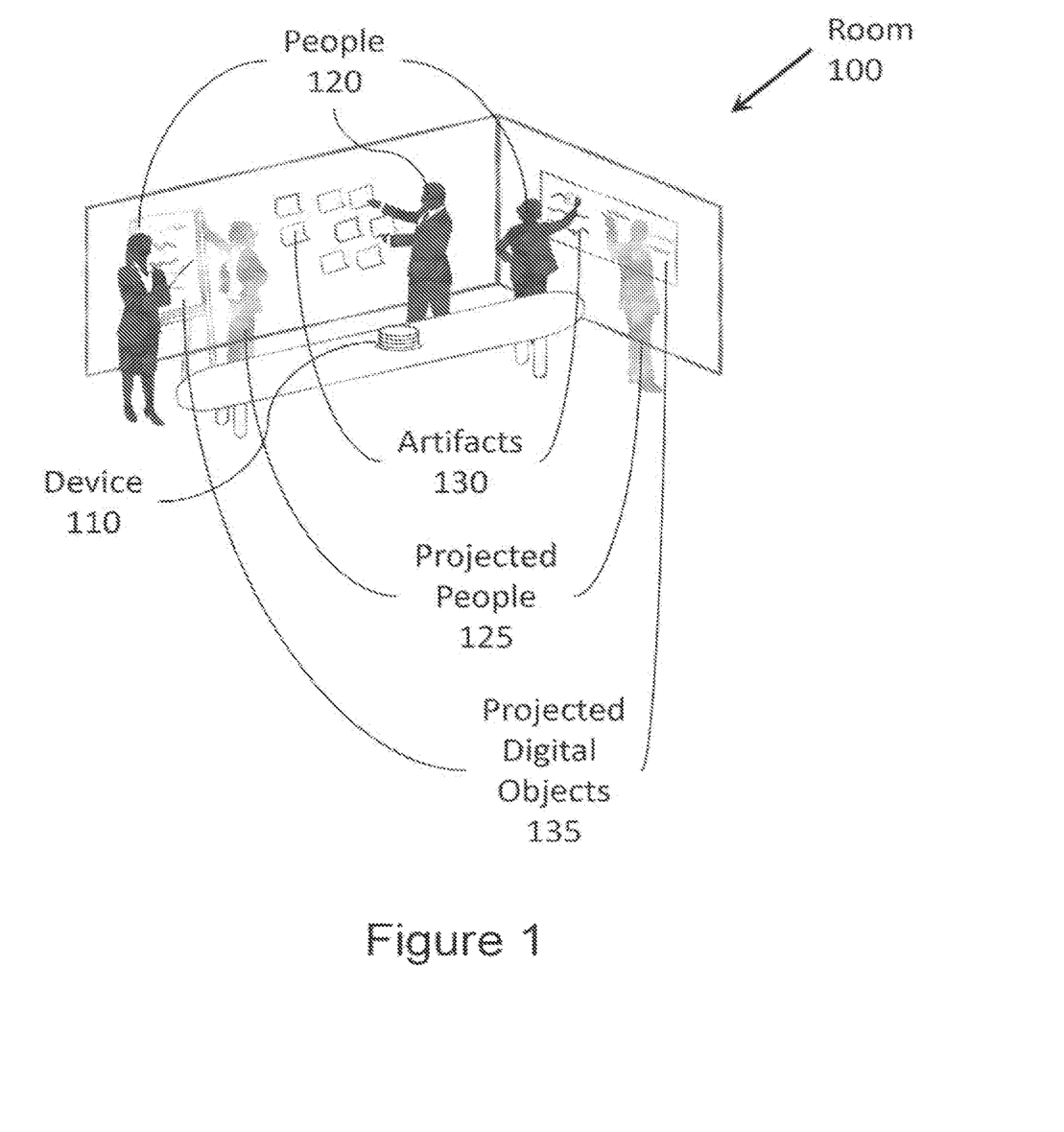
FIG. 1 illustrates an example room, people, and artifacts on which example apparatuses, systems, and methods, and equivalents, may operate.

FIG. 1 illustrates an example room 100, people 120, and artifacts 130 on which example systems and methods, and equivalents may operate. It should be appreciated that the items depicted in FIG. 1 are illustrative examples and many different features and implementations are possible.

Room 100 may be, for example, a conference room. Room 100 contains a device 110, Device 110 may contain equipment for capturing (e.g., video cameras, high-resolution still image cameras, microphones, motion sensors) actions of people 120 in room 100 as the people 120 Interact with artifacts 130 in room 100. Artifacts 130 may include, for example, physical objects and digital content elements available for interaction in room 100. Physical objects may include, for example, note cards, flip charts, models, writing on a whiteboard, and other objects physically present in room 100. Digital content elements may include items projected or displayed in room 100 (e.g., presentation slides, a television screen). In some instances it may also be appropriate to treat people 120 as artifacts. Treating people 120 as artifacts may facilitate capturing actions and interactions of people 120 with other people 120 and with artifacts 130 in room 100.

Device 110 may also contain equipment for projecting (e.g., projectors) projected people 125 and projected digital objects 135 into room 100. The digital objects 135 and people 125 projected into room 100 may be, for example, stored on device 110 in association with a virtual space, at a network or Internet location accessible by device 110, and so forth. Projecting digital objects 135 and people 125 into room 100 may facilitate review and/or interaction with the projected people 125 and the projected digital objects 135. Thus, the projected people 125 and projected digital objects may be projected based on previous recording, simultaneous recording (e.g., a projection of a person or artifact being captured in real time), a combination of the above, and so forth. As used herein, projection may include projection by a projector, display using, for example, a TV screen or monitor, and other representation techniques (e.g., augmented reality glasses, VR headsets).

As used herein, a virtual space may be a representation of a room that is maintained as data in a data store (e.g., locally within device 110, at a server remote from device 110). Several digital objects may be associated with each virtual space. Each digital object may be associated with an artifact that was at one point stored in the digital space (e.g., by capturing an artifact from a physical space, creating a digital object from a web page or video). Maintaining individual digital objects separately from one another may facilitate review and manipulation of digital objects on an individual basis. By way of comparison, a video camera that records all content in front of it without distinguishing between different persons and/or artifacts in the field of view of the camera may not be able to facilitate review of items recorded at differing times, or interacting with objects in a video after the video has been recorded. By storing digital objects in the virtual space and capturing state changes of the artifacts and/or digital objects, and interactions with the artifacts and/or digital objects, review of two different digital objects at two points In time may be achieved.

Each virtual space in the data store may be associated with a given project, topic, product, and so forth. Thus, when a team working on, for example, a given project associated with a virtual space concludes a meeting and then later reconvenes, information associated with the virtual space from the concluded meeting may be quickly recovered by loading the virtual space and projecting digital objects 135 into the new meeting location. By way of illustration, if, during a first meeting, text was written on a white board and a set of post it notes were organized on a different wall, digital objects describing the text and post it notes may be stored to corresponding locations of a virtual space, if the virtual space is loaded at a later time, representations of the digital objects may be projected, effectively recovering a state of the previous room.

In some examples, device 110 may also contain communication equipment (e.g., network card, Bluetooth functionality) to facilitate transmitting information associated with artifacts 130, and so forth. The information associated with artifacts 130 may be transmitted to and from, for example, a remote server or other network storage location, another device 110 operating in a different location, and so forth. Alternatively, device 110 may contain memory (e.g., a hard disk) for storing information associated with artifacts 130. The information associated with artifacts may be stored, whether remotely or locally, as digital objects in association with a virtual space. The communication equipment may also facilitate controlling other electronic devices within room 100, control of device 110 via other electronic devices, and so forth. Controlling other electronic devices may facilitate, for example, device 110 causing representations of digital objects to be projected into room 100 via, for example, monitors, screens, smart boards, and so forth within room 100.

As mentioned above, to facilitate reconstruction of artifacts into the new meeting location, digital objects associated with a given virtual space may be given "locations" within the virtual space. These locations within the virtual space may facilitate preservation of, for example, relative spatial relationships between artifacts and people over time.

To facilitate preservation of these spatial relationships, it may be important for device 110 to Identify locations within room 100 that are suitable for projection of representations of the digital objects. In some examples, this may include orienting the virtual space to room 100 so that representations of digital objects projected back into room 100 are projected onto suitable locations within room 100. By way of illustration, it may be difficult for people 120 to view and/or interact with representations of digital objects 135 projected onto windows. Similarly, it may be preferable to select projection locations on walls that are largely free from obstructions and/or decorations to ensure representations of digital objects are projected clearly and onto suitable surfaces within room 100 (e.g., blank white walls). Identifying suitable locations within room 100 may also include detecting and adjusting for light sources, ambient light, colors of surfaces onto which projected digital objects 135 and/or projected people 125 will be projected, and so forth.

Various techniques may be used to identify suitable locations within room 100 for projection of projected digital objects 135 and/or projected people 125, For example, device 110 may contain various sensors (e.g., infrared sensors for distance mapping, edge detection), logics and so forth for identifying attributes of room 100 so that room 100 can be calibrated to the virtual space.

In FIG. 1, device 110 is illustrated as seated atop a table within room 100. In this example, device 110 may be a unit that can be transported from room 100 to a different room as necessary if people 120 need to continue their meeting at another location or time. This may allow many different spaces to be converted into a meeting room to handle relocations, space availability issues, and so forth, consequently, device 110 may be able to identify suitable locations for projection of digital objects in many different types and/or sizes of rooms 100.

Because device 110 may be transported between several different locations having different attributes, device 110 may be able to modify projected representations of digital objects. This may include, resizing projections, distorting projections, and adjusting for relative positions of digital objects based on attributes of a room 100 in which device 110 is operating. Distorting a projection may include increasing or decreasing the amount of blank space between projected digital objects, and so forth. For example, if device 110 is transported from a small room to a larger room, projections in the larger room may be enlarged to better fill the space. Similarly, if device 110 is projecting a representation of a person moving between two digital objects in a space that is smaller than the space where the person was originally recorded, the speed at which the projected person moves between the two projected digital objects may be reduced to preserve the relative spatial movement of the person. This may be appropriate if the digital objects have been projected closer to one another to fit a smaller space.

In another example, device 110 may be built into room 100. in this case, though the room may have many surfaces known to device 110 to be suitable for projection, depending on the types and/or attributes of digital objects projected, device 110 may need to make decisions regarding these digital objects even if device 110 always projects into the same room. By way of illustration, a room built to house a device may be able to be designed to better accommodate recording and/or projection equipment. For example, projectors hung from the ceiling may create larger projections than one placed on a surface (e.g., a table) within such a room 110.

For the purpose of this application, the term "projecting", as used with respect to a digital object may include displaying the digital object, as a representation of a digital object projected onto a segment of a wall may be functionally equivalent to a representation of a digital object displayed on a monitor on a wall instead. Additionally, a designated space may be designed so that surfaces within the room are more amenable to preserving spatial relationships of artifacts within a digital representation of the room (e.g., in a virtual space). In these examples, device 110 may interact with display devices built into room 100. This may facilitate a combination of projection from device 110 onto a wall, and display of digital objects on a monitor.

In room 100, three people 120 are having a meeting discussing a topic (e.g., a project, a problem, a product). The people are interacting with artifacts 130 including text on a white board, and a set of post it notes. Additionally, device 110 is also projecting several projected people 125 and projected digital objects 135 into room 100. As mentioned above, device 110 may treat people 120 as though they were also artifacts for the purposes of capturing digital objects associated with the people 120 and/or projecting representations of the people 120. The projected people 125 and projected digital objects 135 may be associated with digital objects in a virtual space that were captured during a previous meeting. Consequently, some of the projected people 125 may be projections of some of the people 120 currently in room 100. Thus, device 110 may allow the people 120 to review their previous conversations and interactions with artifacts from a previous meeting. This may reduce information loss between meetings and enhance productivity.

Alternatively, the projected people and projected artifacts may be in a separate room with their own device that is in communication with device 110. Consequently, device 110 may be interacting with a virtual space that is being used by multiple groups of people 120 simultaneously. Once suitable locations for projection of digital objects are found in various rooms 100, artifacts 130 and people 120 may be projected into other rooms as projected people 125 and projected digital objects 135 to facilitate synchronous communication. This type of synchronous communication may be desirable when all parties do not fit in a single room, or parties are spread among different physical locations (e.g., in different cities).

Using recording equipment, device 110 may record interactions of people 120 with artifacts 130, projected digital objects 135, and so forth in room 100. These interactions may include, modifying artifacts 130, creating artifacts 130, removing artifacts 130, discussing artifacts 130, and so forth. These interactions may then be stored in device 110 or transmitted to a remote server storing a virtual space, and projected onto suitable locations into other rooms. The virtual space may facilitate preserving spatial relationships of artifacts in the same room, artifacts in different rooms that have been linked to facilitate synchronous communication, and so forth.

By way of illustration, consider the person 120 in room 100 interacting with the notes attached to the wall. In one example, each note may be treated as an individual artifact. If the person interacting with the notes rearranges the notes or modifies a note (e.g., by writing on the note), device 110 may record these interactions and/or modifications and cause these modifications to be stored as digital objects in a virtual space. In various examples, locations of the notes relative to one another may be preserved as information in the digital space to attempt to preserve additional information regarding the digital objects, ft may be valuable to preserve this additional spatial relationship information because the spatial relationships between the notes may include valuable information that would not be maintained if only the contents of the notes were preserved. This is because notes, or other types of artifacts in other examples, may be organized spatially into groups to signify relationships, importance, and so forth.

In other examples, device 110 may facilitate projection of artifacts 130 and/or interactions with artifacts 130 at a later time and/or in a different room. By way of illustration, if the people 120 in room 100 have time limited schedules but plan to reconvene the next day in a different room, device 110 may allow the people 130 to resume their meeting by projecting representations of digital objects into the different room. Consequently, because the different room may have different features (e.g., the different room has windows while room 100 does not), device 110 may identify suitable locations within the different room at which to project the representations. This may preserve meeting states over time so that meetings regarding projects can continue where they left off and so artifact states and/or discussions may be reviewed as necessary. As mentioned above, because different rooms may have different dimensions, projected digital objects may be distorted to better fit into locations identified as being suitable for projection by device 110.

These features may add additional functionality beyond some meeting room setups Involving a set of video recording equipment and either a set of displays (e.g., televisions, monitors) or projectors. Though meetings in these types of rooms may be recorded, the recordings may not individually track components over time and preserve state changes. Consequently, such a setup, if recording functionality exists at all, might require replaying everything going on in one of these rooms, without being able to separate and control review of individual components on their own. Additionally, if preserving a meeting state at the end of a meeting is desirable, certain artifacts may need to be preserved. Though maintaining a mode! may be easy, maintaining notes written on a whiteboard may require more effort. If the notes have been captured over time by device 110, the notes may be automatically preserved and recovered once the appropriate virtual space is loaded using device 110 {or a similar device).

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system, A module may include a software controlled microprocessor, a discrete module (e.g., ASIC), an analog circuit, a digital circuit, a programmed module device, a memory device containing instructions, and so on. Modules may include one or more gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
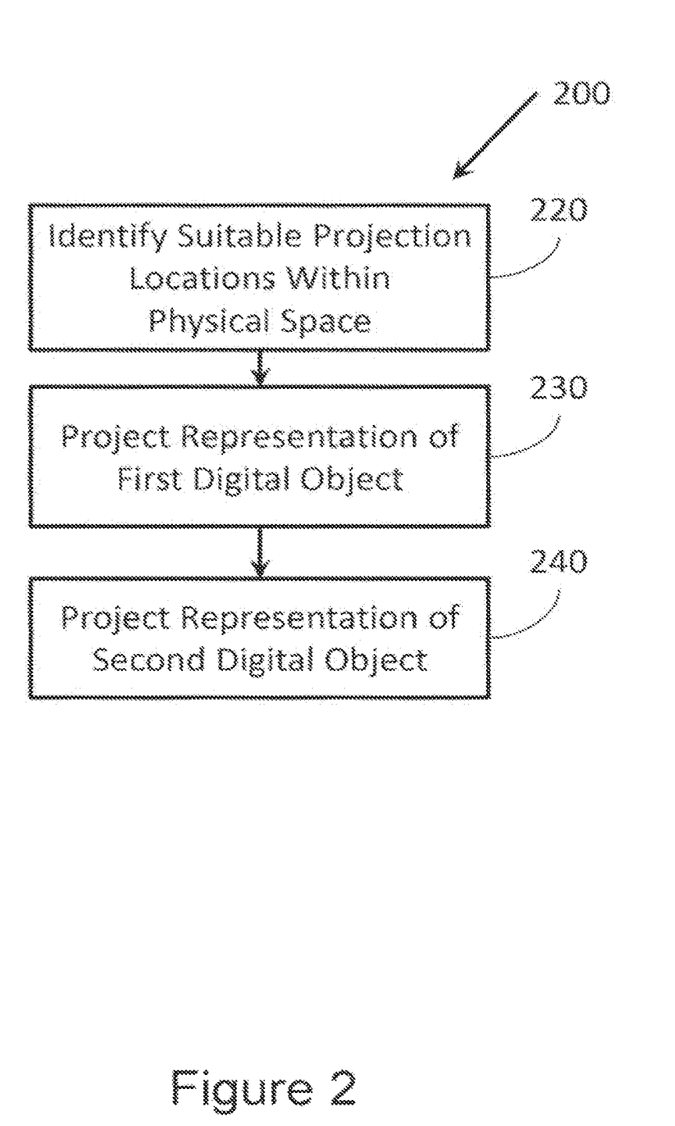
FIG. 2 illustrates a flowchart of example operations associated with relationship preserving projection of digital objects.

FIG. 2 illustrates an example method 200 associated with relationship preserving projection of digital objects. Method 200 may be embodied on a non-transitory computer-readable medium storing computer-executable instructions. The instructions, when executed by a computer may cause the computer to perform method 200. In other examples, method 200 may exist within logic gates and/or RAM of an application specific integrated circuit.

Method 200 includes analyzing a physical space at 220. The physical space may be analyzed to identify suitable locations within the physical space for projection of digital objects. The digital objects may be stored in a virtual space. Analyzing the physical space may include using chroma key techniques. Chroma key techniques may identify a baseline state of the physical state. The baseline state may then be used to facilitate identifying differences between current states of the physical space and the baseline state. Consequently, analyzing the physical space may also include identifying areas of the room that are static and non-changing, as well as entities in the room that are dynamic and may potentially move or be moved. This may facilitate avoiding projecting onto dynamic entities in the room.

Analyzing the physical space may also Include identifying areas of the room with few obstructions or decorations, identifying distances to walls to facilitate focusing projections, identifying colors of surfaces onto which digital objects may be projected, and so forth.

Method 200 also includes projecting a representation of a first digital object from the virtual space at 230. The representation of the first digital object may be projected onto a first suitable location in the physical space. Projecting the representation of the first digital object may facilitate, for example, manipulation of the first digital object, replaying previous manipulations of the first digital object, viewing the first digital object, and so forth.

In one example, the representation of the first digital object may be distorted when the representation of the first digital object is projected onto the first suitable location. The representation of the first digital object may be distorted to fit the representation of the first digital object to a size of the first suitable location. The representation of the first digital object may be distorted by removing extraneous information from the representation of the first digital object. The representation of the first digital object may also be distorted by replicating extraneous information from the representation of the first digital object. Extraneous information may be, for example, pixels of a digital object that do not compose content of the digital object. By way of illustration, writing on a white board may be spread out when it is captured as a digital object and contain substantial white space. Consequently, the white space may be removed or replicated as necessary when projecting the representation of the writing on the white board to better fit representation of the writing to the size of the first suitable location. Other distortions (e.g., growing an object, shrinking an object) may also be appropriate.

Method 200 also includes projecting a representation of a second digital object from the virtual space at 240, The representation of the second digital object may be projected onto a second suitable location in the physical space. In various examples, the first suitable location and the second suitable location may preserve a spatial relationship between the first digital object and the second digital object. Preserving the relationships between digital objects when projecting them may facilitate preserving information about the digital objects that would not be preserved solely by storing content of artifacts from which digital objects were created. By way of illustration, when brainstorming ideas for a project, many ideas may be organized into groups, and these ideas may be arranged spatially to reflect these ideas. If only the ideas are preserved, the organization information may be lost, Consequently preserving and projecting digital objects in a manner that preserves the spatial relationship information may also preserve associations of the ideas.

Figure 3:
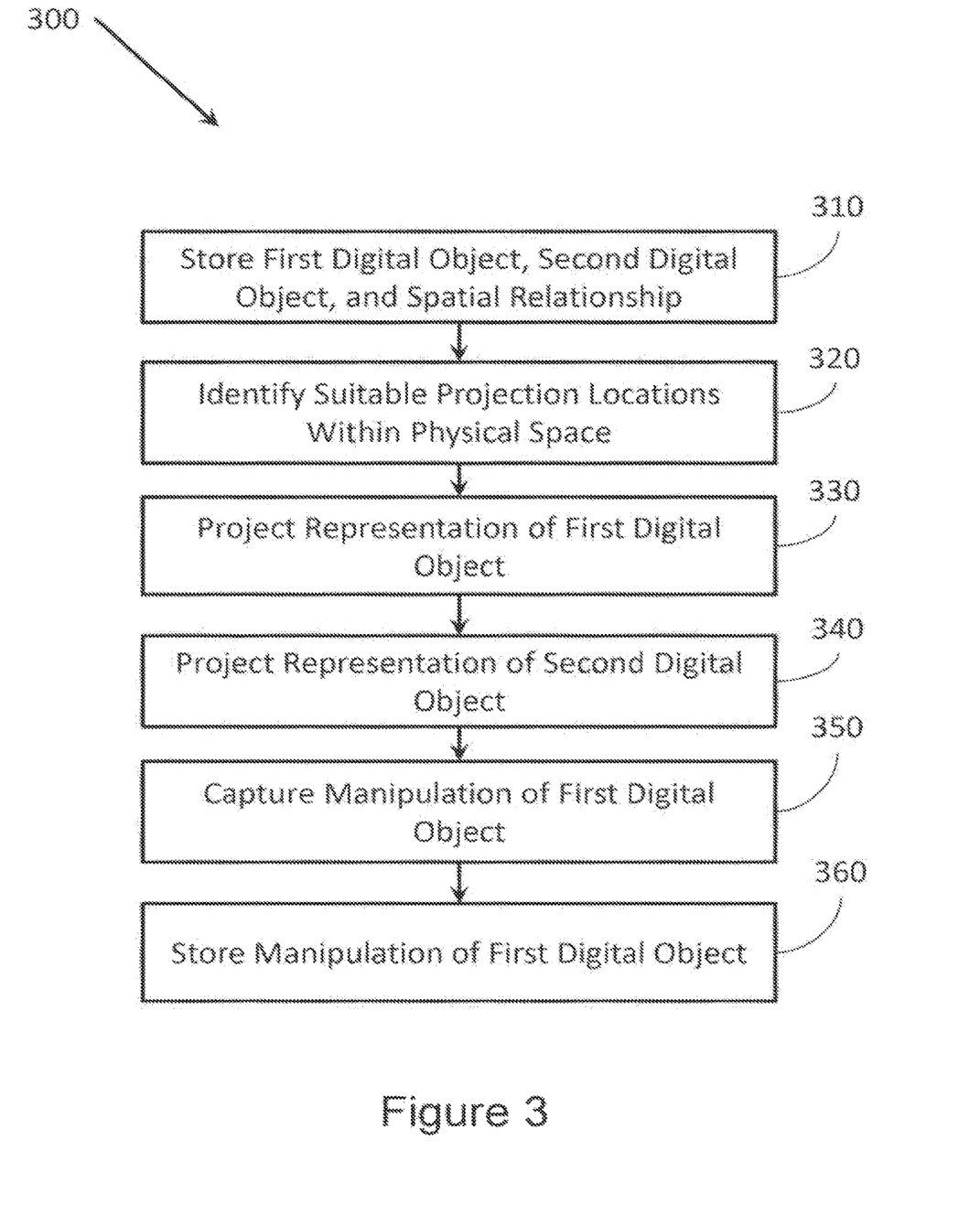
FIG. 3 illustrates another flowchart of example operations associated with relationship preserving projection of digital objects.

FIG. 3 illustrates a method 300 associated with relationship preserving projection of digital objects. Method 300 includes several actions similar to those described above with reference to method 200 (FIG. 2), For example, method 300 includes analyzing a physical space at 320, projecting a representation of a first digital object at 330, and projecting a representation of a second digital object at 340.

Method 300 also includes capturing a manipulation of the first digital object at 350. Method 300 also includes storing the manipulation of the first digital object in the virtual space at 360, Capturing and storing the manipulation of the first digital object may facilitate subsequent projection of the first digital object In the manipulated state. Further, if the prior state of the first digital object is not deleted, projection of both the pre-manipulation state of the first digital object and the manipulated state of the first digital object may be projected. This may allow projection of states of the first digital object independent of projection of states of other digital objects, allowing review of different digital objects at different time periods. Various manipulations of the first digital object are possible. The first digital object may be manipulated by moving the first digital object, deleting the first digital object, changing an attribute of the first digital object, changing the content of the first digital object, and so forth. In some examples, moving the first digital object may cause spatial relationships between the first digital object and other digital objects to be updated, in some examples, the manipulation of the first digital object may be associated with audio captured near the time of the manipulation of the first digital object.

Method 300 also includes storing the first digital object, the second digital object, and the spatial relationship to the virtual space at 310. The first digital object may be stored by capturing a first artifact from an original physical space. The second digital object may be stored by capturing a second artifact from the original space. In one example, the first artifact and the second artifact may be identified as distinct artifacts using seam carving techniques prior to their capture. The spatial relationship may describe a relationship between the first artifact and the second artifact In one example, the virtual space may serve as a template comprising the first digital object, the second digital object. Storing digital objects as a template may facilitate loading the template in multiple different areas to essentially have a starter kit for certain types of projects or tasks. For example, if a company has a common task that requires a certain initial set of resources, a template of these resources may be stored to be loaded several times as different "projects" that can later be manipulated as each individual project is completed.

Figure 4:
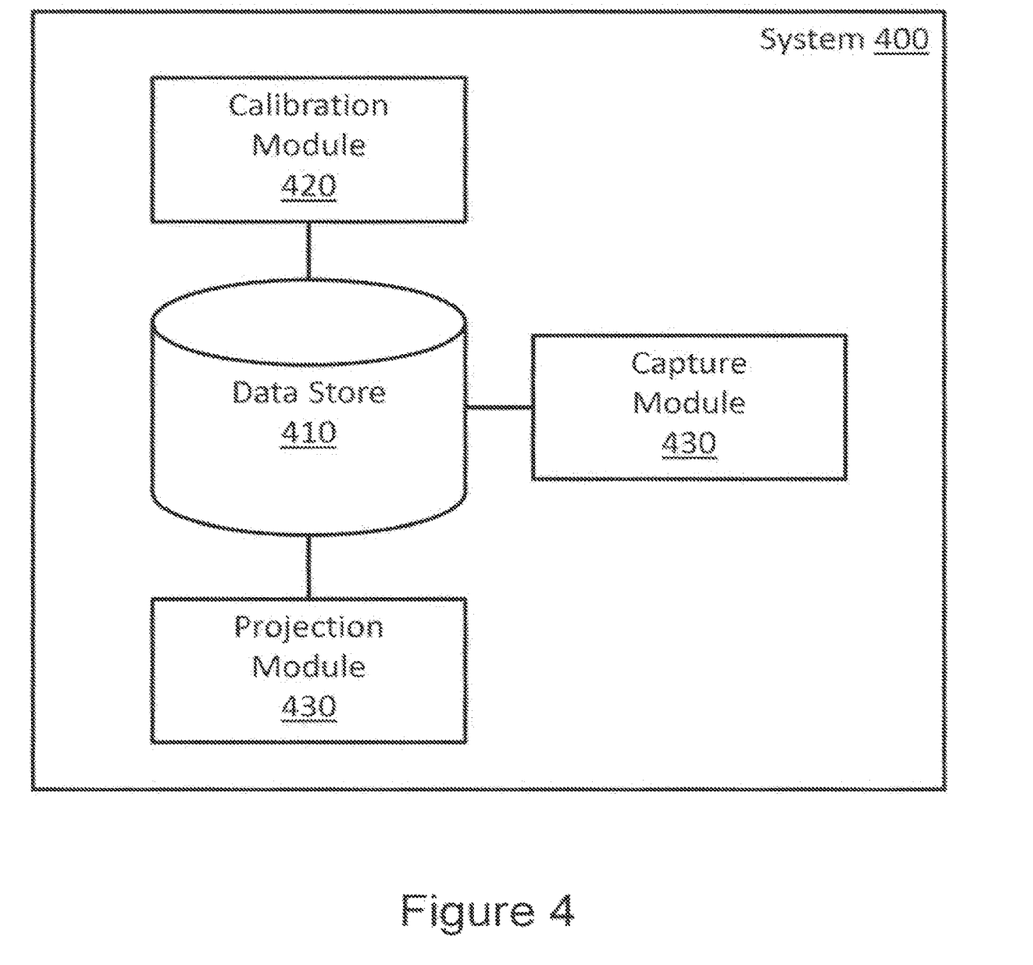
FIG. 4 illustrates an example system associated with relationship preserving projection of digital objects.

FIG. 4 illustrates an example system 400 associated with relationship preserving projection of digital objects. System 400 includes a data store 410. Data store 410 may store a virtual space. The virtual space may contain a first digital object, a second digital object, and a spatial relationship between the first digital object and the second digital object.

System 400 also includes a calibration module 420. Calibration module 420 may map portions of a physical space to the virtual space. Mapping portions of the physical space to the virtual space may facilitate identifying suitable projection locations in the physical space for representations of the first digital object and the second digital object.

System 400 also includes a projection module 430. Projection module 430 may project a representation of the first digital object into the physical location at a first suitable projection module. Projection module 430 may also project a representation of the second digital object into the physical location at a second suitable projection location. The first suitable projection location and the second suitable projection location preserve the spatial relationship.

In some versions of system 400, system 400 may also include a capture module 440. Capture module 440 may capture a modification to the first digital object. Capture module 440 may also store the modification to the first digital object in the data store. Consequently, capture module 440 may facilitate projecting updated versions of digital objects at a later time, and may allow the ongoing manipulation of digital objects.

Figure 5:
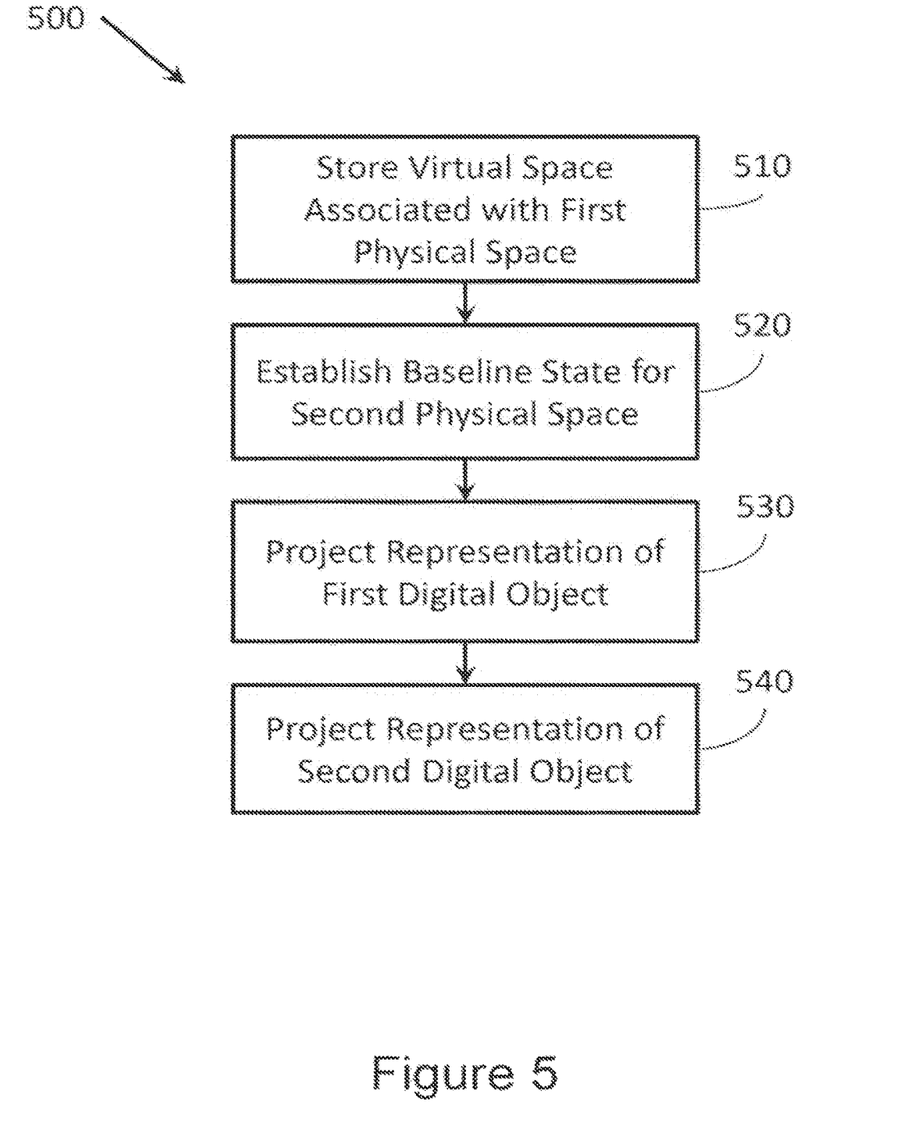
FIG. 5 illustrates another flowchart of example operations associated with relationship preserving projection of digital objects.

FIG. 5 illustrates a method 500. Method 500 includes storing a virtual space at 510, The virtual space may be associated with a first physical space. The virtual space may include a first digital object. The first digital object may be associated with a first artifact. The first artifact may be in the first physical space. The virtual space may also include a second digital object. The second digital object may be associated with a second artifact. The second artifact may also be in the first physical space. The virtual space may also store a spatial relationship between the first digital object and the second digital object. The spatial relationship may be, for example, a directional relationship, a relative distance, an absolute distance, and so forth.

Method 500 also includes establishing a baseline state for a second physical space at 520. The baseline state may identify suitable locations for projection of digital objects associated with the virtual space. The baseline state may be created in a manner that attempts to preserve users' perceptions of spatial relationships of artifacts.

Method 500 also includes projecting a representation of the first digital object at 530. The representation of the first digital object may be projected at a first suitable location in the second physical space. Method 500 also includes projecting a representation of the second digital object at 540. The representation of the second digital object may be projected at a second suitable location in the second physical space. The second digital object may be projected in a manner that preserves the spatial relationship between the first digital object and the second digital object, in one example, the first digital object may be a static object and the second digital object may be a dynamic object. In this example, the second digital object may be projected in a manner that avoids deformation of the first digital object and the second digital object. In various examples, static objects may typically be inanimate objects such as writing, pictures, displays, and so forth in a room. A dynamic object may be an animate object such as a person that may move and, for example, cause temporary obstruction of other dynamic or animate objects. A dynamic object may include relatively stationary people (e.g., a person sitting in a chair). Knowing that the person may move, objects may be positioned around even more stationary dynamic objects to attempt to reduce collisions and/or distortions of artifacts if a dynamic object moves.

Figure 6:
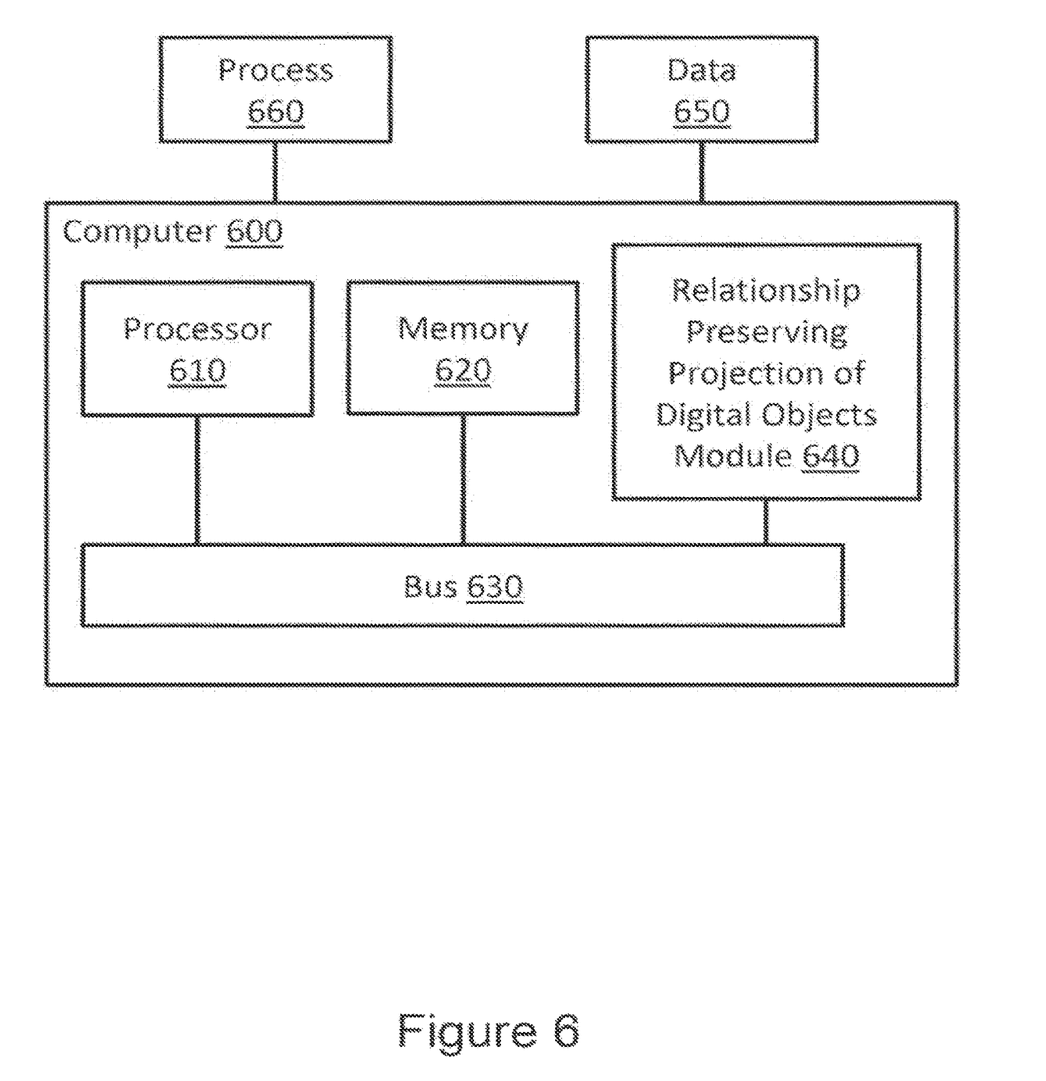
FIG. 6 illustrates an example computing device in which example systems and methods, and equivalents, may operate.

FIG. 6 illustrates an example computing device in which example systems and methods, and equivalents, may operate. The example computing device may be a computer 600 that includes a processor 810 and a memory 820 connected by a bus 630. The computer 600 includes a relationship preserving projection of digital objects module 640. In different examples, relationship preserving projection of digital objects module 640 may be implemented as a non-transitory computer-readable medium storing computer-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of various processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 860 and/or data 650. Computer 600 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computer-implemented method, comprising:
   capturing, by a computing system, at a first point in time, one or more physical artifacts;
   storing, by the computing system, in a virtual space, one or more digital objects, wherein each of the digital objects corresponds to a given one of the physical artifacts;
   associating, by the computing system, the one or more digital objects with a meeting;
   identifying, by the computing system, locations in a first physical space for the meeting, wherein the locations are suitable for projecting representations of the one or more digital objects within the first physical space; and
   reconstructing, by the computing system, at a second point in time, the meeting, wherein the representations of the one or more digital objects are projected to the locations within the first physical space, wherein at least one of the representations of the one or more digital objects is distorted to fit a location within the first physical space.

2. The computer-implemented method of claim 1, wherein the distortion to fit the location within the first physical space comprises one or more of removing extraneous information or replicating extraneous information.

3. The computer-implemented method of claim 1, further comprising:
   replaying, by the computing system, previous manipulations of at least one of the digital objects.

4. The computer-implemented method of claim 1, further comprising:
   capturing, by the computing system, a manipulation of at least one of the digital objects; and
   storing, by the computing system, the manipulation of the at least one of the digital objects.

5. The computer-implemented method of claim 1, wherein the one or more physical artifacts are captured from the first physical space at the first point in time.

6. The computer-implemented method of claim 1, wherein the one or more physical artifacts are captured from a second physical space at the first point in time.

7. The computer-implemented method of claim 1, wherein the reconstructing the meeting comprises:
   determining, by the computing system, a difficulty in presenting a representation of a given one of the digital objects at a first location within the first physical space; and
   presenting, by the computing system, the representation of the given one of the digital objects at a second location within the first physical space.

8. The computer-implemented method of claim 7, wherein the determining the difficulty in presenting the representation of the given one of the digital objects at the first location within the first physical space comprises:

determining, by the computing system, the first location within the first physical space to include one or more of:
one or more windows;
one or more obstructions; or
one or more decorations.

9. The computer-implemented method of claim 1, wherein the storing, in the virtual space, of the one or more digital objects comprises:
storing, by the computing system, a spatial relationship between at least a first of the digital objects and a second of the digital objects.

10. A non-transitory computer-readable storage medium including instructions that, when executed by at least one processor of a computing system, cause the computing system to perform a method comprising:
capturing, at a first point in time, one or more physical artifacts;
storing, in a virtual space, one or more digital objects, wherein each of the digital objects corresponds to a given one of the physical artifacts;
associating the one or more digital objects with a meeting;
identifying locations in a first physical space for the meeting, wherein the locations are suitable for projecting representations of the one or more digital objects within the first physical space; and
reconstructing, at a second point in time, the meeting, wherein the representations of the one or more digital objects are projected to the locations within the first physical space, wherein at least one of the representations of the one or more digital objects is distorted to fit a location within the first physical space.

11. The non-transitory computer-readable storage medium of claim 10, wherein the reconstructing the meeting comprises:
determining a difficulty in presenting a representation of a given one of the digital objects at a first location within the first physical space; and
presenting the representation of the given one of the digital objects at a second location within the first physical space.

12. A system, comprising:
at least one processor; and
a memory storing instructions that, when executed by the at least one processor, cause the system to perform:
capturing, at a first point in time, one or more physical artifacts;
storing, in a virtual space, one or more digital objects, wherein each of the digital objects corresponds to a given one of the physical artifacts;
associating the one or more digital objects with a meeting;
identifying locations in a first physical space for the meeting, wherein the locations are suitable for projecting representations of the one or more digital objects within the first physical space; and
reconstructing, at a second point in time, the meeting, wherein the representations of the one or more digital objects are projected to the locations within the first physical space, wherein at least one of the representations of the one or more digital objects is distorted to fit a location within the first physical space.

13. The system of claim 12, wherein the reconstructing the meeting comprises:
determining a difficulty in presenting a representation of a given one of the digital objects at a first location within the first physical space; and
presenting the representation of the given one of the digital objects at a second location within the first physical space.

14. The system of claim 13, wherein the determining the difficulty in presenting the representation of the given one of the digital objects at the first location within the first physical space comprises:
determining the first location within the first physical space to include one or more of:
one or more windows;
one or more obstructions; or
one or more decorations.

\* \* \* \* \*